(12) United States Patent
Ashman

(10) Patent No.: US 7,909,412 B2
(45) Date of Patent: Mar. 22, 2011

(54) CYCLE WHEEL MOUNTING SYSTEM

(76) Inventor: J. Leonard Ashman, Folsom, CA (US)

( * ) Notice: Subject to any disclaimer, the term of this patent is extended or adjusted under 35 U.S.C. 154(b) by 369 days.

(21) Appl. No.: 12/215,809

(22) Filed: Jun. 30, 2008

(65) Prior Publication Data

US 2009/0243255 A1 Oct. 1, 2009

Related U.S. Application Data

(60) Provisional application No. 60/937,970, filed on Jul. 2, 2007.

(51) Int. Cl.
*B60B 27/06* (2006.01)
(52) U.S. Cl. .................................. 301/110.5; 301/124.2
(58) Field of Classification Search ............... 301/110.5, 301/124.2; 192/64; 280/279, 288
See application file for complete search history.

(56) References Cited

U.S. PATENT DOCUMENTS

| | | | |
|---|---|---|---|
| 3,922,018 A * | 11/1975 | Shook | 301/110.5 |
| 4,049,319 A | 9/1977 | Hartung | |
| 4,079,958 A | 3/1978 | Segawa | |
| 4,154,327 A * | 5/1979 | Haeussinger | 192/64 |
| 4,170,369 A | 10/1979 | Strutman | |
| 4,567,973 A | 2/1986 | Butz | |
| 4,595,242 A | 6/1986 | Wehmeyer | |
| 4,664,252 A | 5/1987 | Galbraith | |
| 4,679,862 A | 7/1987 | Luo | |
| 4,906,053 A | 3/1990 | Kawai | |
| 5,121,973 A | 6/1992 | Phillips | |
| 5,163,740 A * | 11/1992 | Kawai et al. | 301/110.5 |
| 5,165,762 A | 11/1992 | Phillips | |
| 5,332,294 A | 7/1994 | Haeussinger | |
| 5,433,306 A | 7/1995 | Yang | |
| 5,492,211 A * | 2/1996 | Wu | 192/115 |
| 5,531,510 A | 7/1996 | Yamane | |
| 5,549,315 A | 8/1996 | Ashman | |
| 5,676,228 A * | 10/1997 | Lin | 192/64 |
| 5,823,555 A | 10/1998 | Ashman | |
| 5,984,423 A | 11/1999 | Becker | |
| 6,030,052 A | 2/2000 | Watarai et al. | |
| 6,089,675 A | 7/2000 | Schlanger | |
| 6,290,304 B1 | 9/2001 | Lashinske | |
| 6,296,322 B1 | 10/2001 | Marzocchi et al. | |
| 6,386,643 B1 | 5/2002 | Marzocchi et al. | |
| 6,409,281 B1 | 6/2002 | Kanehisa et al. | |
| 6,435,622 B1 | 8/2002 | Kanehisa et al. | |
| 6,454,363 B1 | 9/2002 | Vignocchi et al. | |
| 6,497,314 B2 | 12/2002 | Kanehisa | |
| 6,523,659 B2 | 2/2003 | Kanehisa et al. | |
| 6,561,593 B2 | 5/2003 | Godwin | |
| 6,669,306 B1 | 12/2003 | Hara et al. | |
| 7,011,321 B2 | 3/2006 | Hargroder | |
| 7,044,272 B2 * | 5/2006 | Takizawa | 188/26 |
| RE39,528 E | 3/2007 | Kanehisa et al. | |

(Continued)

FOREIGN PATENT DOCUMENTS

DE          1 155 355          4/1964

(Continued)

*Primary Examiner* — Russell D Stormer
(74) *Attorney, Agent, or Firm* — Thomas R. Lampe

(57) ABSTRACT

A cycle wheel mounting system wherein a cycle wheel hub is rotatably mounted on an axle rod having threaded portions. Structure associated with the cycle wheel hub and the axle rod, including projections on the hub casing of the cycle wheel hub, and receivers for the projections on the cycle frame ensures proper alignment of the cycle wheel when mounted.

9 Claims, 3 Drawing Sheets

U.S. PATENT DOCUMENTS

| | | | |
|---|---|---|---|
| 7,252,344 B2 | 8/2007 | Mercat et al. | |
| 7,367,632 B2 | 5/2008 | Chang | |
| 7,654,548 B2 * | 2/2010 | Kanehisa et al. | 280/279 |
| 2002/0067068 A1 | 6/2002 | Kanihisa et al. | |
| 2002/0067069 A1 | 6/2002 | Kanihisa et al. | |
| 2006/0158022 A1 | 7/2006 | Nicolai | |
| 2007/0052286 A1 | 3/2007 | Montague et al. | |
| 2007/0287574 A1 | 12/2007 | Chen | |
| 2008/0157586 A1 | 7/2008 | Montague et al. | |
| 2008/0197600 A1 * | 8/2008 | Watarai | 280/279 |

FOREIGN PATENT DOCUMENTS

| | | |
|---|---|---|
| DE | 9218 358.1 | 3/1994 |
| EP | 0 094649 | 11/1983 |
| EP | 0 277 576 | 8/1988 |
| EP | 0 835 188 | 4/1998 |
| EP | 1 211 102 | 6/2002 |
| FR | 668943 | 3/1952 |
| FR | 2188-551 | 1/1974 |
| FR | 2501-124 | 9/1982 |
| FR | 2518-461 | 6/1983 |
| FR | 2776-612 | 10/1999 |
| GB | 572237 | 9/1945 |
| IT | 596057 | 8/1959 |
| JP | 55 51601 | 4/1980 |
| WO | WO 89/04258 | 5/1989 |

* cited by examiner

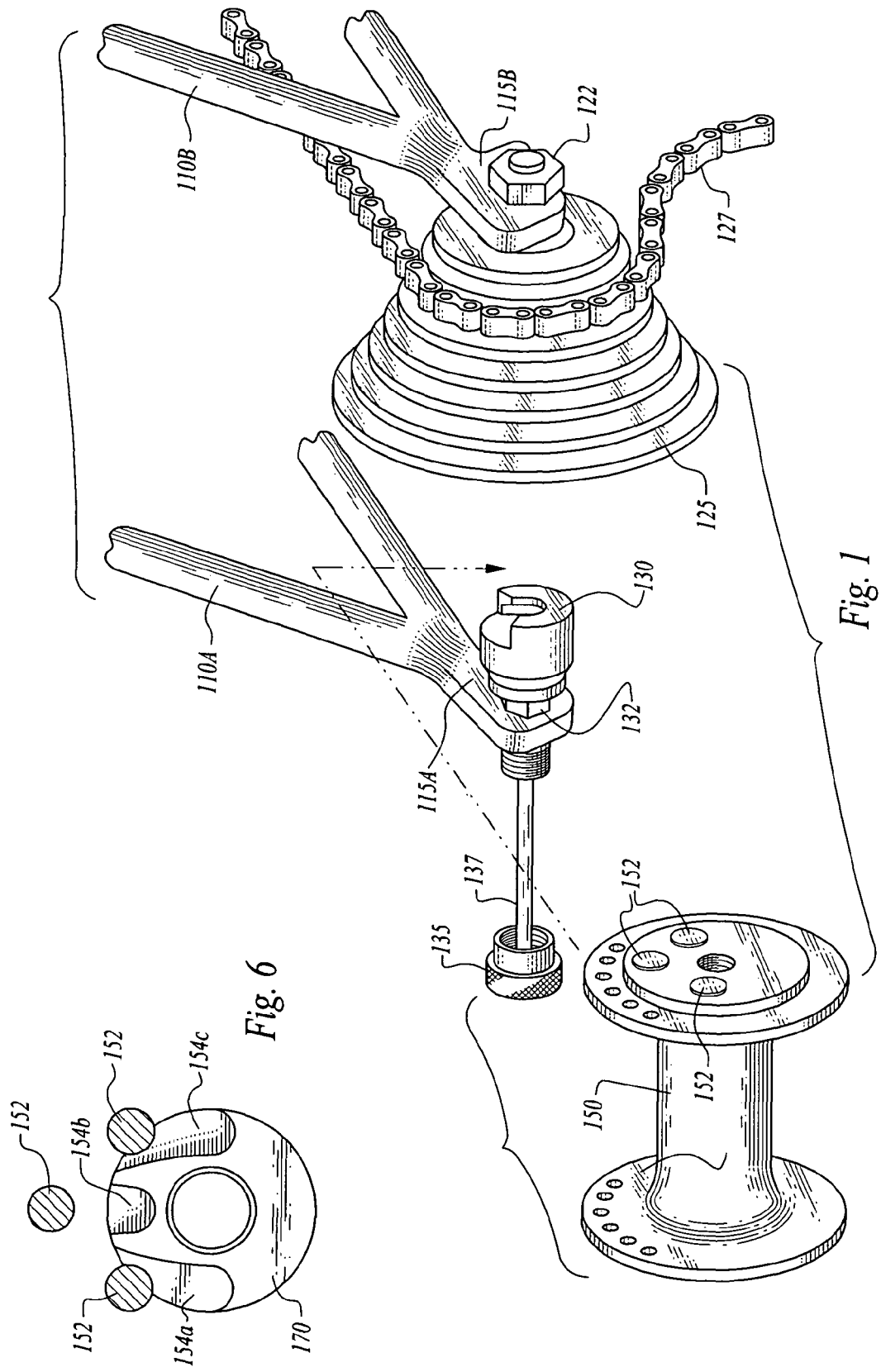

CYCLE WHEEL MOUNTING SYSTEM

This Application is based on and claims the benefit of U.S. Provisional Patent Application No. 60/937,970, filed Jul. 2, 2007.

TECHNICAL FIELD

This invention relates to apparatus for readily mounting a cycle wheel on a cycle frame or removing the wheel from the frame. The invention has particular, but not exclusive, application to bicycle wheels driven by cogsets.

BACKGROUND OF THE INVENTION

Chain driven bicycle drive trains have existed for many years. Generally the chain receives power input from a pedal crank that has a motive force exerted upon it by a rider's legs. The force is transferred by the chain to the driven wheel by a geared cog, for example, which is in turn mechanically linked to a hub. The hub is attached to the drive wheel by means of spokes or solid inserts such as in the so-called disk wheels. In this way linear force from a rider's legs is transformed to rotational force applied to the wheel and then to the road surface.

From time to time the wheel must be detached from the bicycle frame, for example, to change a flat tire or to replace a worn part. There exist many contemporary methods for attaching the wheel to the bicycle frame. One method uses a solid axle threaded on both ends. Once the axle ends have been located correctly in the frame, nuts are tightened to fix the wheel in place. A second method uses a hollow axle through which a rod, or so-called skewer, is run. One end of the skewer has a lever and the other end an adjustable nut. Once the wheel is in the correct position the lever is operated which results in a clamping force to fix the wheel in place.

While these methods are functional, they suffer from a common flaw. The chain must be disengaged from the drive cogs in order to remove the wheel. Depending on the complexity of the cogset, this can be a messy and time consuming operation. For example, consider a ten speed cogset typical of contemporary road or mountain bicycles. In order to remove the wheel the chain must be driven to the smallest cog in order to provide the requisite slack chain tension to allow the wheel to drop away from the frame. Once done, the derailleur mechanism, which is used to move the chain up and down the cogset, must be held out of the way so that the cogset, which is attached permanently to the wheel, will have the needed clearance to drop away from the frame lugs.

Once the wheel is clear, maintenance can occur. But the same problems exist upon remounting of the wheel. First the derailleur must be moved out of the way, then the chain must be manually placed on the correct cog, then the wheel carefully moved into the frame lugs and the securing mechanism engaged. One major problem with prior art methods is that it is difficult to ensure the proper alignment of the wheel in the frame lugs. This happens in part because the chain exerts an off-axis load on the cogset which tends to make the wheel align off center. The result is that the wheel may then interfere with the brake mechanism causing an unwanted drag.

A second major problem with prior art methods is that the derailleur is very delicate. If the user inadvertently applies a force in the wrong place the alignment of the derailleur box could be affected. This is so because the derailleur is essentially a parallelogram that moves the chain left or right depending on the rider's selection of gear. Any misalignment will cause difficulty in shifting. Finally, since the chain is now on the smallest cog, the shifter mechanism must once again be operated to place the chain on a cog that will allow a rider to easily get moving.

U.S. Pat. Nos. 5,549,315 and 5,823,555, both issued to Leonard J. Ashman, generally disclose cycle wheel mounting apparatus for facilitating installation and removal of cycle wheels employing notches for releasably interconnecting cycle frames and wheel hubs. The following patent documents are also known: U.S. Pat. No. 4,079,958, issued March, 1978, U.S. Pat. No. 4,170,369, issued October, 1979, U.S. Pat. No. 4,400,038, issued August, 1983, U.S. Pat. No. 4,634,139, issued January, 1987, U.S. Pat. No. 4,659,097, issued April, 1987, U.S. Pat. No. 4,805,941, issued February, 1989, U.S. Pat. No. 5,022,672, issued June, 1991, U.S. Pat. No. 5,058,913, issued October, 1991, U.S. Pat. No. 5,118,125, issued June, 1992, U.S. Pat. No. 5,284,383, issued February, 1994, U.S. Pat. No. 5,326,157, issued July, 1994, U.S. Pat. No. 5,601,299, issued February, 1997, U.S. Pat. No. 6,290,304, issued Sep. 18, 2001 and U.S. Pat. No. 6,647,643, issued July, 1997.

DISCLOSURE OF INVENTION

The present invention relates to apparatus for a driven bicycle hub that eliminates the need for a user to become involved in any way with the cogset or chain. The hub assembly of the apparatus is comprised of three main pieces: a non-driven side slotted receiver, a driven side receiver and a center section that positively mates with both receivers. A solid axle attaches the three main pieces together in a two stage threading action. The mating action is such that misalignment of the wheel is impossible.

The non-driven side slotted receiver of the present invention is permanently attached to the non-driven side frame lug. The driven side receiver, which has the cogset and thus the chain mounted to it, is attached to the driven side frame lug. The center section is hollow to allow a solid axle to pass through it. The solid axle has a handle on one end and is threaded on the opposite end. At a point close to the threaded end the axle has a unique hex segment that is used to engage a captive sleeve that also runs through the center section.

In operation, the user turns the knob to loosen the axle from the driven side frame lug mounting hardware, slides the axle outwardly until the hex segment engages the captive sleeve, again uses the knob to loosen the center section from the driven side receiver, and then slides the axle out to its outward-most position. At this point the center section with the wheel may be removed from the bicycle. Since the cogset and chain are still mounted in place on the driven side receiver, the user need not become involved with either in order to remove the wheel.

A major advantage of the present invention is that the alignment of the cogset, chain and derailleur does not change. Thus it is impossible to cause damage to the delicate derailleur when dismounting or remounting the driven wheel. Further, since the center section mates with the non-driven side slotted receiver and driven side receiver in a singular way, there is no possibility of misaligning the wheel upon remounting to the bicycle frame.

Other features, advantages and objects of the present invention will become apparent with reference to the following description and accompanying drawings.

BRIEF DESCRIPTION OF DRAWINGS

FIG. 1 is an overall exploded, perspective view of mounting apparatus constructed in accordance with the teachings of the present invention;

FIG. 6 is a diagrammatic view illustrating three drive pins prior to entering recesses formed in a freewheel body.

BEST MODE FOR CARRYING OUT THE INVENTION

Figure 2A:
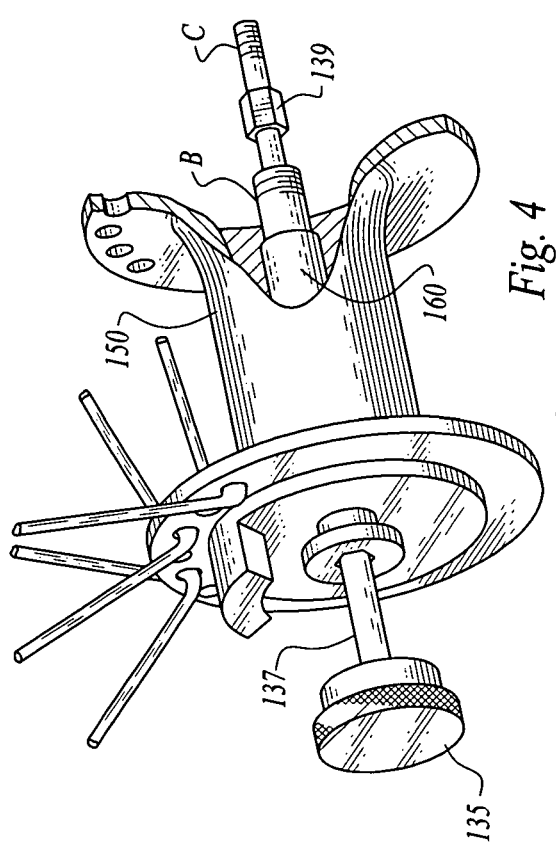
FIGS. 2A and 2B are respectively right side and left side perspective views illustrating the hub of the present invention incorporating structural features for locating and positioning the hub.

As briefly noted above, the present invention provides substantial improvements in the way a driven bicycle wheel is mounted to a bicycle frame. It will be understood, however, that the apparatus of the present invention just as easily can be used for a non-driven bicycle wheel. Moreover, it will be noted that the apparatus of the present invention is equally applicable to so called mountain, road and city types of bicycles.

Referring now to the drawings, no wheel is shown attached to the hub for clarity, it will be recognized by those skilled in the art that any of several mounting means may be used to attach a hub to a wheel.

A typical bicycle frame is shown, having tubing frame members 110A and 110B (FIG. 1). The tube members 110A and 110B have axle mounting lugs 115A and 115B which are used to accept the locating hardware of a bicycle wheel (not shown). In the arrangement disclosed, a drive cogset 125, comprised of a number of individual cogs, is permanently mounted to bicycle frame member 110B by captive hardware 122. On the opposite side, non-driven side receiver 130 is permanently mounted to a bicycle frame member 110A by captive hardware 132. The hub 150 of the wheel has unique locating structure on both sides, for example, locating drive pins 152 on the driven side, the nature and function of which will be described in greater detail below.

A knob or handle 135 is attached to an axle shaft 137. The axle shaft 137 has two sets of threads as further described below that operate to keep the wheel mounted during use of the bicycle.

Dismounting of the wheel is accomplished in a two step operation. First, the knob 135 is loosened to separate the axle shaft from the driven side shouldered sleeve 121, and then knob 135 is further loosened to separate the hub from the cogset 125. Knob 135 is then retracted so that axle shaft 137 clears non-driven side receiver 130 allowing the hub 150 to be removed. During the removal process the chain 127 need not be moved or acted upon in any way. Further, no action need be taken with regard to the cogset 125 or the derailleur (not shown).

Mounting of the wheel occurs in the opposite order. First the hub is properly located in place by means of locating drive pins 152 on the driven side and unique pin and wedge structure, discussed in detail below, that mates with the non-driven side receiver 130. Hollow threaded shouldered sleeve 160 is then threaded through the hub 150 until a first set of threads engages the cogset 125. Once tightened, the axle shaft 137 is then pushed in further to allow both a second set of threads of an internal shouldered bolt (discussed in detail in conjunction with FIG. 3 below) to engage the driven side shouldered sleeve 121 and an internal thread of knob 135 are synchronized to simultaneously provide positive engagement with their respective mating threads. The combination of locating drive pins 152 and the non-driven side pin and wedge insures that there is no possibility of a misalignment. This means that no action need be taken to realign brake calipers, chain or derailleur parts.

Figure 2B:
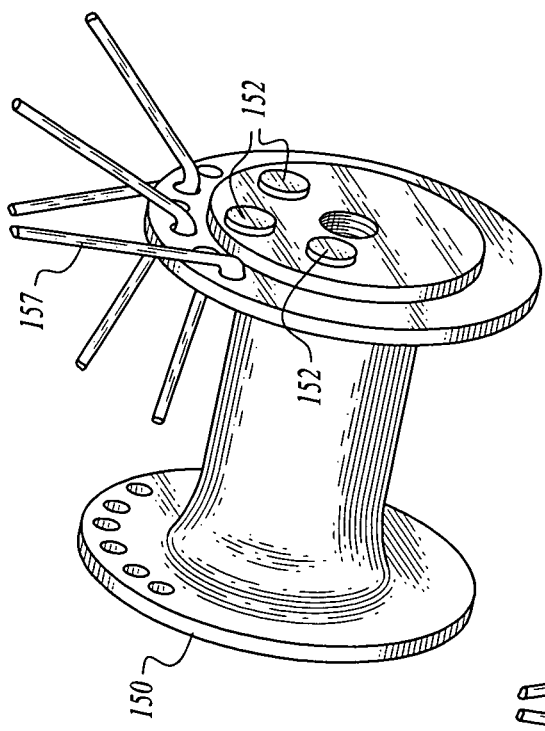

FIGS. 2A and 2B show details of the unique locating structure employed in the apparatus of the present invention. Note that spokes 157 are shown for reference only and are typical of spokes used in a bicycle wheel. It will be recognized by those of ordinary skill in the art that any type of spoke or wheel/hub construction could be used with the apparatus of the present invention. Referring to FIG. 2A, the driven side of hub 150 is shown. Three locating drive pins 152 are placed such that when the wheel is moved into position between the frame lugs the locating drive pins 152 fit precisely in three matching pin receiver cutouts or recesses 154a, 154b and 154c. These cutouts are in the form of slots formed in freewheel body 170.

Referring now to FIG. 2B, on the non-driven side of hub 150, locating collar 155 and locating wedge 156 are placed such that when the wheel is moved into position between the frame lugs, the locating collar 155 and the locating wedge 156 fit precisely into the non-driven side receiver 130, shown in FIG. 1 and discussed above. When the hub 150 is placed in position between the frame members 110A and 110B, the wheel will only drop into place when it is properly aligned, thereby preventing any misalignment due to chain tension or cogset interference. The automatic and accurate alignment of the wheel prevents damage to other parts of the bicycle, for example, to the brake mechanism or the derailleur assembly.

Figure 3:
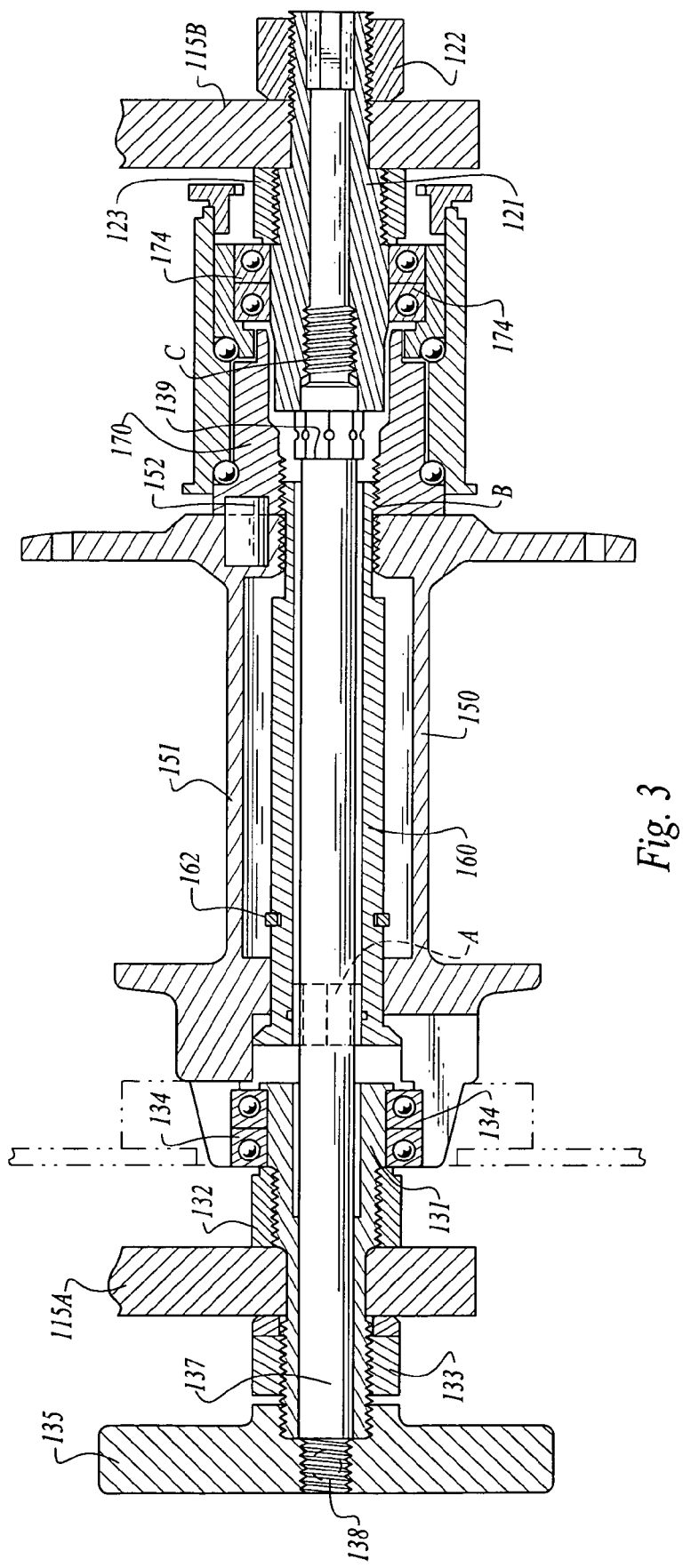
FIG. 3 is a detailed cross-sectional view of the apparatus of the present invention.

With reference to FIG. 3, a detailed cross section of the apparatus of the present invention is shown. Referring first to the driven side frame lug 115B, a driven side shouldered sleeve 121 is fixedly attached to the bicycle frame by means of inboard nut 123 and outboard nut 122. Bearings 174 are press fit onto driven side shouldered sleeve 121 in the conventional manner. It will be noted that the two bearings 174 are used to both increase the load bearing surface and to increase lateral stability of the wheel during use. Load bearing ability is increased as a result of a larger load area and lateral stability is increased as a result of locating the load point of the bearings 174 outboard of the cogs that are mounted on freewheel body 170.

Freewheel body 170 is attached to the driven side shouldered sleeve 121 and bearings 174 in the conventional manner. In a preferred embodiment the freewheel is a Shimano 3OR98030 freewheel, but it will be recognized by those of skill in the art that any suitable freewheel could be used. Since the freewheel body 170 has the cogset 125 mounted on it, the entire assembly comprised of freewheel body 170, cogset 125 and chain 127 that drives the individual cogs remains attached to the bicycle frame at frame lug 115B when the hub 150 is removed as described above and also (in greater detail) below.

Turning now to non-driven side bicycle frame lug 115A, non-driven side shouldered sleeve 131 is fixedly attached to the bicycle frame by means of inboard nut 132 and outboard nut 133. Bearings 134 are press fit onto non-driven side shoulder sleeve 131 in the conventional manner. It will be noted that the two bearings 134 are used to both increase the load bearing surface and lateral stability of the wheel during use. Load bearing ability is increased as a result of a larger load area. Non-driven side receiver 130 is also attached to bearings 134 in the conventional manner such that when hub 150 is removed, non-driven side receiver and associated parts remain attached to the bicycle at frame lug 115A.

Hub 150 includes a hub casing 151 and hollow threaded shouldered sleeve 160. Hub casing 151 is of conventional design in that it has both driven side and non-driven side flanges with holes to accept wheel spokes. In a preferred embodiment the hub casing may be made from either 6061-T6 or 7075-T6 aluminum. It will be recognized by those skilled in the art that other materials could be used without departing from the spirit of the invention. The center of hub casing 151 is hollow to allow hollow shouldered bolt 160 to pass through.

The non-driven side of hollow shouldered bolt 160 has a shoulder of a larger diameter than the body thereof. This shoulder is used to locate the hub in the non-driven side receiver 130 during mounting of the wheel. The hollow shouldered bolt 160 also has a stop ring 162 located near the non-driven end. The purpose of stop ring 162 is to prevent the user from completely retracting hollow shouldered bolt 160. A hexagonal hole is located at the non-driven end of hollow shouldered bolt 160 as indicated by area A in FIG. 3. As will be described below, this is used to accommodate hexagonal section 139 of axle rod 137 in order to turn the axle rod to disengage hollow shouldered bolt 160 from freewheel body 170. The driven side end of hollow shouldered bolt 160 is threaded in area B. This threaded section is used to engage the freewheel body 170 during mounting.

Axle rod 137 passes through the center of non-driven side shouldered sleeve 131, hollow shouldered bolt 160, freewheel body 170 and driven side shouldered sleeve 121. Knob 135 is attached to axle rod 137 by means of a pin 138. Knob 135 is used to turn axle rod 137 either clockwise or counterclockwise to mount or dismount the hub 150. Near the driven side end of axle rod 137 a hexagonal section 139 is used to engage area A of the shouldered sleeve as discussed above. At the far end of the driven side of axle rod 137, threaded area C is used to engage driven side shouldered sleeve 121 during mounting. The combined action of engaging threaded area B and threaded area C during use provides superior stiffness for the wheel. Moreover, as noted above, an internal thread on knob 135 engages the thread of non-driven side shouldered sleeve 131 simultaneously through use of a synchronized thread system. This method provides a three point attachment which is superior to existing art methods.

Figure 4:
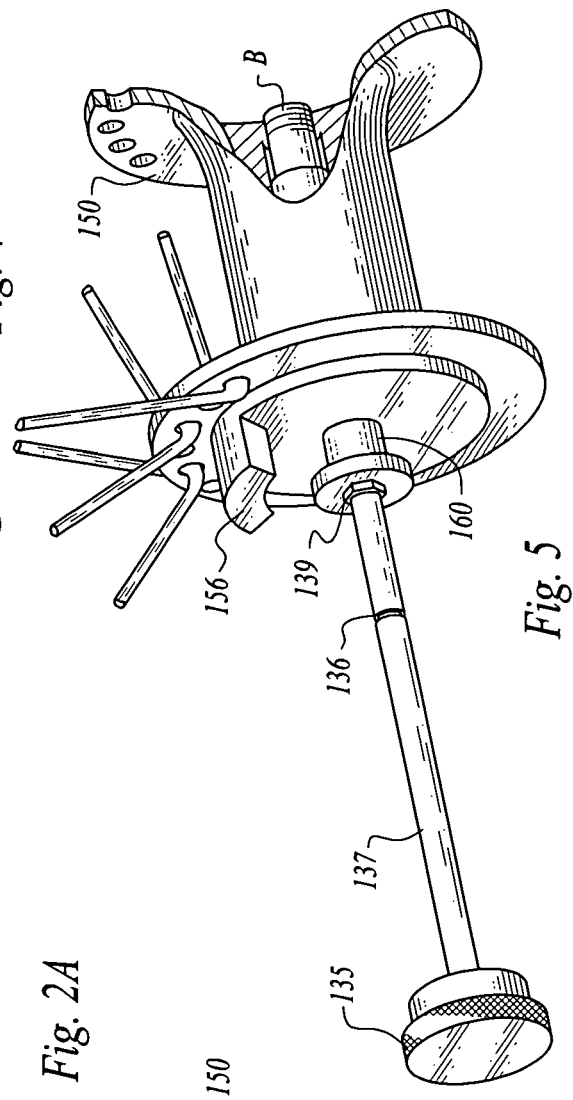
FIG. 4 is a perspective view illustrating details of the hub attachment apparatus of the present invention in mounted position.
Figure 5:
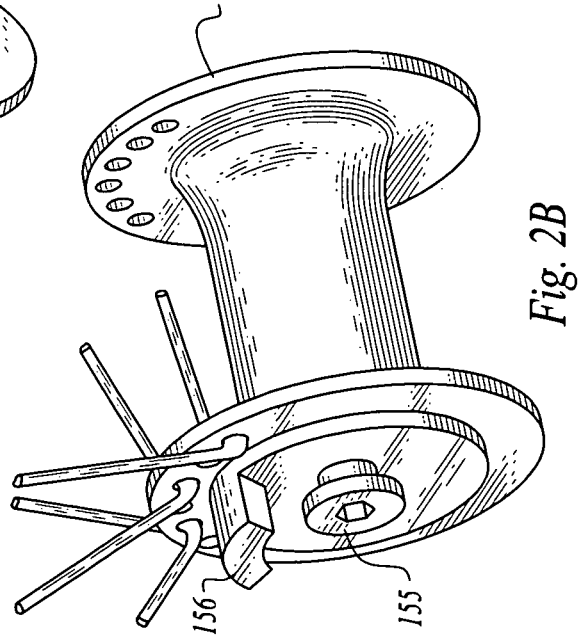
FIG. 5 is a perspective view illustrating structural details of the hub attachment apparatus of the present invention in un-mounted position.

FIGS. 4 and 5 illustrate details of the operation of the present invention. Structural items such as spokes, frame members, cogset, freewheel, and chain have been eliminated from the figures to aid in a clear understanding of the invention, however, it will be understood that these items are in place and operate in the normal manner. Further, it will be assumed that the wheel is mounted on the bicycle frame and that the user is going to dismount it for some purpose.

FIG. 4 illustrates a cutaway view of hub 150. In the mounted state knob 135 has been turned clockwise so that the threaded section C of axle rod 137 is engaged with the driven side shouldered sleeve 121. Also, threaded section B of hollow threaded shouldered sleeve 160 is engaged with the freewheel body 170. The user turns knob 135 counterclockwise to loosen threaded section C. As this occurs, axle rod 137 retracts from driven side shouldered sleeve 121. Hexagonal section 139 is free to turn since it resides within a clear space of the freewheel body 170 as shown in FIG. 3. At this point in time hollow threaded shouldered sleeve or bolt 160 is still firmly attached to freewheel body 170 via threaded section B.

Once the threaded section C of axle rod 137 has completely disengaged from driven side shouldered sleeve 121, the user retracts axle rod 137 until the hexagonal section 139 engages with the hexagonal section A of the non-driven side shouldered sleeve 131. This is shown in FIG. 5.

In FIG. 5 hub 150 is once again shown, but here the axle rod 137 has been retracted to engage the hexagonal section 139 in the hollow threaded shouldered sleeve or bolt 160. Since the user cannot see the hexagonal section 139, an index mark 136 is provided. When the axle rod 137 has been retracted to a point where the index mark 136 is visible, the hexagonal section 139 has engaged and is ready to turn hollow shouldered bolt 160. The user continues to turn knob 135 counterclockwise until threaded hollow shouldered sleeve bolt 160 is completely disengaged from freewheel body 170. At this point the hollow threaded shouldered sleeve or bolt 160 will line up with the locator wedge 156 and the hub, with the wheel, can be removed from the bicycle when axle rod 137 is pulled to a stop. The outward motion of hollow threaded shouldered sleeve or bolt 160 is limited by stop ring 162, thus the various components of the apparatus remain attached and thus, advantageously, will not be lost or misplaced.

The mounting operation is the reverse of the dismounting operation. The user ensures that the axle rod 137 is in the proper position, aligns the locating pins 152 and the locator wedge 156 with their respective receivers, and drops the hub 150 into place. Because the locator wedge 156 is tapered and the locating pins 152 have fixed receivers, there is no possibility that a misalignment of the hub 150 can occur. As a result, the brakes, chain, freewheel and derailleur remain in their original positions and will require no adjustment. Recall also that the cogset and chain are in the same position as when the wheel was dismounted, so no extra action is required of the user in order to make the bicycle ready to ride.

Among advantages, of the present invention is the increased degree of convenience for the user when compared with other methods known in the art. While other removable hub methods exist, none provides the self alignment and stability of the method and apparatus of the present invention.

Another advantage of the present invention is facilitating maintenance activities. Unlike other wheel mounting methods, the method of the present invention allows complete access to the chain, derailleur, cogset and hub mechanism for inspection, lubrication, and any maintenance that may be required.

The invention claimed is:

1. Apparatus for mounting a cycle wheel on a cycle frame, said cycle frame having spaced first and second mounting lugs, said apparatus comprising in combination:

a receiver connected to said first mounting lug and extending inwardly therefrom toward said second mounting lug, said receiver defining a notch;

a double-ended axle rod extending through said first mounting lug and through said receiver, said axle rod having a first end projecting outwardly from said first mounting lug and a second end projecting inwardly from said first mounting lug;

a driven side sleeve connected to said second mounting lug having an interior space and an opening communicating with said interior space for receiving said axle rod second end;

a cycle wheel hub including a hub casing and a double-ended hollow member extending through said hub casing and beyond opposed ends of said hub casing, said axle rod extending through said double-ended hollow member when said second end of said axle rod is received by the interior space of said driven side sleeve, said driven side sleeve having interior sleeve threads and said axle rod having external axle rod threads, said interior sleeve threads and said axle rod exterior threads engageable to attach said second axle end to said second mounting lug to rotatably support said hub casing; and a handle attached to the axle rod first end and a non-driven side sleeve attached to said first mounting lug, said non-driven side sleeve having external threads threadedly engaged by said handle when said interior sleeve threads of said driven side sleeve and said axle rod exterior threads are in engagement.

2. The apparatus according to claim 1 wherein the double-ended hollow member of said cycle wheel hub has threads about a portion thereof extending from said hub casing in the direction of said driven side sleeve and maintaining said double-ended hollow member fixed in position relative to said driven side sleeve.

3. The apparatus according to claim 2 including a freewheel body located between said hub casing and said driven side sleeve, the threads about said portion of said double-ended hollow member of said cycle wheel hub being in threaded engagement with said freewheel body.

4. The apparatus according to claim 3 additionally including cogs of a cogset attached to and radiating outwardly from said freewheel body.

5. The apparatus according to claim 3 wherein said double-ended hollow member of said cycle wheel hub comprises a hollow, threaded shouldered sleeve axially movable relative to said hub casing, said axle rod including a projection engageable with said hollow, threaded shouldered sleeve to rotate said hollow, threaded shouldered sleeve to selectively alternatively either thread the hollow, threaded shouldered sleeve to the freewheel body or unthread the hollow, threaded shouldered sleeve from the freewheel body.

6. The apparatus according to claim 3 including stop structure on said double-ended hollow member of said cycle wheel hub for limiting axial movement thereof relative to said hub casing.

7. The apparatus according to claim 1 additionally comprising alignment structure for aligning said cycle wheel hub upon installation thereof on said cycle frame, said alignment structure including a locating collar and a locating wedge projecting from said hub casing positionable in said receiver with said wedge located in said notch.

8. The apparatus according to claim 1 wherein said alignment structure includes at least one locator pin projecting from said hub casing for positioning in a recess formed in a freewheel body adjacent to said hub casing.

9. The apparatus according to claim 8 wherein a plurality of pins project from said hub casing and comprise drive pins employed to drive said hub casing upon rotation of said freewheel body.

\* \* \* \* \*